(12) United States Patent
Ohata et al.

(10) Patent No.: US 8,372,628 B2
(45) Date of Patent: Feb. 12, 2013

(54) SULFUR-OXIDIZING BACTERIA AND THEIR USE IN BIOLEACHING PROCESSES FOR SULFURED COPPER MINERALS

(75) Inventors: Atsuko Ohata, Hitachi (JP); Manabu Manabe, Colina (CL); Pilar A. Parada Valdecantos, Colina (CL)

(73) Assignee: Biosigma S.A., Colina (CL)

( * ) Notice: Subject to any disclaimer, the term of this patent is extended or adjusted under 35 U.S.C. 154(b) by 458 days.

(21) Appl. No.: 12/693,004

(22) Filed: Jan. 25, 2010

(65) Prior Publication Data

US 2010/0180729 A1 Jul. 22, 2010

Related U.S. Application Data

(62) Division of application No. 11/506,031, filed on Aug. 17, 2006, now Pat. No. 7,700,343.

(30) Foreign Application Priority Data

Aug. 17, 2005 (CL) .................................. 2101-2005

(51) Int. Cl.
*C10G 32/00* (2006.01)
(52) U.S. Cl. ..................................... 435/282; 435/252.1
(58) Field of Classification Search .......................... None
See application file for complete search history.

(56) References Cited

U.S. PATENT DOCUMENTS 4,571,387 A 2/1986 Bruynesteyn et al.

FOREIGN PATENT DOCUMENTS

| EP | 00431 | 9/1981 |
| GB | 1528061 | 10/1978 |
| WO | WO 98/39491 | 9/1998 |

OTHER PUBLICATIONS

Kelly, et al., "Reclassification of some species of *Thiobacillus* to the newly designed genera *Acidithiobacillus* gen. Nov., *Halothiobacillus* gen. Nov and *Thermithiobacillus* gen. Nov.",*Int. J. Syst. Evol. Microbiol.* 2000, 50:511-516.

Selenska-Pobell, et al., "Identification and discrimination of thiobacilli using ARDREA, RAPD, and rep-APD." *J. Appl. Microbiol.* 1998, 84:1085-1091.

Okamoto et al., "Improvement of chalcopyrite leaching in acidic sulfate solutions by redox potencial control." *Copper 2003-Cobre 2003, vol. VI-Hydrometallurgy of Copper (Book 1)*, p. 67-81.

Nowaczyk et al. Polish Journal of Environmental Studies. vol. 9, No. 3. (2000) pp. 195-201.

*Primary Examiner* — Irene Marx
(74) *Attorney, Agent, or Firm* — Merchant & Gould P.C.

(57) ABSTRACT

The present invention is related to an isolated chemolithotrophic bacterium belonging to species *Acidithiobacillus thiooxidans* named Licanantay, deposited in Deutsche Sammlung von Mikroorganismen and Zellkulturen GmbH-DSMZ with number DSM 17318, and its use in pure form or in mixtures that contains it for bioleaching processes of minerals or sulfured metallic species concentrates. This Licanantay strain DSM 17318 has sulfur-oxidizing activity in both primary and secondary sulfured minerals, especially in the case of chalcopyrite, covellite, bornite, chalcocite, enargite and tennantite.

7 Claims, 5 Drawing Sheets

Seq ID No. 1:

CGTGCCAGCAGCCGCGGTAATACGGGGGGTGCAAGCGTTAATCGGAATCAC
TGGGCGTAAAGGGTGCGTAGGCGGTGCATTAGGTCTGTCGTGAAATCCCCG
GGCTCAACCTGGGAATGGCGGTGGAAACCGGTGTACTAGAGTATGGGAGAG
GTGGTGGAATTCCAGGTGTAGCGGTGAAATGCGTAGAGATCTGGAGGAACA
TCAGTGGCGAAGGCGGCCACCTGGCCCAATACTGACGCTGAGGCACGAAAG
CGTGGGGAGCAAACAGGATTAGATACCCTGGTAGTCCACGCCCTAAACGATG
AATACTAGATGTTTGGTGCCAAGCGTACTGAGTGTCGTAGCTAACGCGATAAG
TATTCCGCCTGGGAAGTACGGCCGCAAGGTTAAAACTCAAAGGAATTGACGG
GGGCCCGCACAAGCGGTGGAGCATGTGGTTTAATTCGATGCAACGCGAAGAA
CCTTACCTGGGCTTGACATGTCTGGAATCCTGCAGAGATGCGGGAGTGCCCT
TCGGGGAATCAGAACACAGGTGCTGCATGGCTGTCGTCAGCTCGTGTCGTGA
GATGTTGGGTTAAGTCCCGCAACGAGCGCAACCCTTGTCCTTAGTTGCCAGC
GGTTCGGCCGGGCACTCTAGGGAGACTGCCGGTGACAAACCGGAGGAAGGT
GGGGATGACGTCAAGTCCTCATGGCCTTTATGTCCAGGGCTACACACGTGCT
ACAATGGCGCGTACAGAGGGAAGCCAAGCCGCGAGGTGGAGCAGACCCCAG
AAAGCGCGTCGTAGTTCGGATTGCAGTCTGCAACTCGACTGCATGAAGTCGG
AATCGCTAGTAATCGCGGATCAGCATGCCGCGGTGAATACGTTCCCGGGCCT
TGTACACACCGCCCGTCACACCATGGGAGTGGATTGTACCAGAAGCCGTTAG
CCTAACCTTCGGGAGGGCGATGACCACGGTATGGTTCATGACTGGGGTGAAG
TCGTAACAAGGTAGCCGTAGGGGAACCTGCGGCTGGATCACCTCC

Figure 4

SULFUR-OXIDIZING BACTERIA AND THEIR USE IN BIOLEACHING PROCESSES FOR SULFURED COPPER MINERALS

This application is a Divisional Application of Ser. No. 11/506,031, filed 17 Aug. 2006, which is claims benefit of Serial No. 2101-2005, filed 17 Aug. 2005, in Chile and which applications are incorporated herein by reference. To the extent appropriate, a claim of priority is made to each of the above disclosed applications.

The present invention is related to isolated chemolithotrophic bacteria belonging to species *Acidithiobacillus thiooxidans* named Licanantay, deposited in Deutsche Sammlung von Mikroorganismen and Zellkulturen GmbH-DSMZ with number DSM 17318, and its use in pure form or in mixtures that contains it for bioleaching processes of minerals or sulfured metallic species concentrates. This Licanantay strain DSM 17318 has sulfur-oxidizing activity in both primary and secondary sulfured minerals, especially in the case of chalcopyrite, covellite, bornite, chalcocite, enargite and tennantite.

The present invention also discloses the use of the above-mentioned sulfur-oxidizing mesophilic bacteria in bioleaching processes where removal of elemental sulfur acting as leaching inhibitor is carried out. The addition of Licanantay bacteria to the bioleaching solution causes the sulfuric acid solution used as leaching solution to leach copper minerals efficiently at ambient temperature, preventing at the same time an excessive increase of the oxidation-reduction potential (ORP) that favors bioleaching.

RELATED PREVIOUS ART

At the present time, more than 90% of the mining copper in the world is obtained from the processing of sulfured copper minerals. Among all sulfured copper species present in minerals, the main species are chalcopyrite, bornite, chalcocite, covellite, tennantite and enargite, chalcopyrite being the most relatively abundant species and therefore the most economically relevant.

In general, pyrometallurgic processes have been used to recover copper contents from sulfured minerals, wherein metallic copper is extracted through purification stages comprising mineral concentration, fusion and conversion, fire refinement and electrolysis. However, this process is not economically viable for low metal content minerals as the ones previously mentioned. Metallic copper is extracted also by using hydrometallurgic processes, as the representative SX-EW process, which comprises sulfuric acid leaching, solvent extraction, separation and electrowinning stages.

The hydrometallurgic process has some advantages as it has low initial capital inversion and low operation costs and is applicable to many types of minerals and copper content levels in the minerals ranging between oxidized copper minerals and secondary copper sulfide minerals. In the hydrometallurgic process, efficiency of the sulfuric acid leaching stage is one of the main factors affecting the whole copper production process.

Sulfuric acid leaching can be implemented by using well known processes such as a chemical leaching process wherein mineral particle size and temperature are adjusted to a bioleaching process that uses thermophilic or mesophilic bacteria. Among these processes, the bioleaching process using mesophilic bacteria has advantages as it can be carried out at ambient temperature and do not require additional energy. Autotrophic bacteria and, in general, iron-oxidizing mesophilic bacteria are used.

A disadvantage is that, although the bioleaching rate is temporarily increased by the addition of iron-oxidizing mesophilic bacteria to the leaching solution, the leaching rate can not be kept at a high level for a long time period; said leaching rate decrease is due to a passivating layer covering the mineral. Said passivating layer has two possible origins: (a) elemental sulfur liberated by the bioleaching reaction and (b) iron (III) hydroxide tendency to form jarosite at pH values over 2. As both compounds precipitate over the mineral, a layer is formed covering the mineral surface which prevents copper leaching.

Some propositions have been made attempting to overcome the above-mentioned bioleaching disadvantages. For example, in U.S. Pat. No. 4,571,387 silver ion as a reaction catalyst, an oxidant such as Fe (III), permanganic acid and a hydrogen peroxide solution are added to the leaching solution to control oxidation-reduction potential (ORP) in the solution in order to keep ORP constant, as described in WO98/39491, being this a condition that favors sulfured mineral bioleaching, as leaching rates are lower at lower ORPs.

Nevertheless, the abovementioned solutions have disadvantages as they have a high economic cost and/or oxidation potential is not readily controllable in the practice.

The present invention discloses a sulfur-oxidizing bacterium and the use thereof in a bioleaching method for sulfured minerals. This method is applicable to various types of minerals and copper content levels ranging between copper oxide minerals and primary and secondary copper sulfide minerals. The particularity of this process is the prevention of the passivation phenomenon that acts as leaching inhibitor, by using an acid bioleaching solution that contains the mesophilic sulfur-oxidizing bacteria Licanantay, simultaneously preventing an excessive increase of the oxidation-reduction potential (ORP). Thus, copper minerals are efficiently leached at ambient temperature.

BACKGROUND OF THE INVENTION

Field of the Invention

The present invention has the objective of disclosing a novel mesophilic strain that prevents the passivation phenomenon in bioleaching processes, said phenomenon acting as a bioleaching inhibitor. By using an acid bioleaching solution that contains the mesophilic sulfur-oxidizing bacteria Licanantay, an excessive increase of the oxidation-reduction potential (ORP) is prevented and therefore copper minerals are efficiently leached at ambient temperature.

Furthermore another objective of the present invention is a bioleaching method using a hydrometallurgic process that can be carried out in a practical situation and under universal conditions applicable to various types of minerals and copper contents levels ranging between oxidized copper minerals and copper sulfide minerals as chalcopyrite, bornite, covellite, chalcocite, tennantite, enargite and the like. The process is preferably applied to chalcopyrite.

Using mesophilic sulfur-oxidizing bacteria in the bioleaching solution, in particular *Acidithiobacillus thiooxidans* strain DSM 17318 named Licanantay, removal of sulfur acting as leaching inhibitor is prevented, in order to leach efficiently copper minerals at ambient temperature, simultaneously preventing an excessive increase of the oxidation-reduction potential (ORP). According to the present invention, elemental sulfur that causes the abovementioned coverage phenomenon is removed as sulfuric acid, thus preventing the decrease of bioleaching rate.

Said process is carried out aerobically, preferably in a pH range between 1.0 and 1.8, and in some cases up to pH 2.5, in order to avoid jarosite formation that limits the bioleaching process.

Likewise, the ORP of the solution is maintained at a value of 500 mV or less relative to a Ag/AgCl reference electrode.

BRIEF DESCRIPTION OF THE DRAWINGS

FIG. 4 shows the nucleic acid sequence of the 16S rDNA gene from *Acidithiobacillus thiooxidans* DSM 17318 (SEQ ID NO: 1). It has 100% homology with other *Acidithiobacillus thiooxidans* strains (ATCC 19377 and NBRC13701).

In order to properly differentiate the different isolated strains RAPD-PCR technique was used (Selenska-Pobell S, Otto A, Kutschke S. Identification and discrimination of thiobacilli using ARDREA, RAPD ("Random Amplification of Polymorphic DNA") and rep-APD. J Appl Microbiol 1998, 84, 1085-1091.), consisting in a PCR amplification using low specificity primers that align randomly with sequences that are present along the whole genome of the analyzed microorganism. This RAPD-PCR system allows obtaining reproducible amplification patterns that are characteristic for the different strains belonging to a single species. In FIG. 5, a differential pattern belonging to 2 *Acidithiobacillus thiooxidans* strains is observed, which demonstrates that both analyzed sequences are different at their genome level, although both strains belong to the same genus and species, which could explain their differences in bioleaching activities.

DESCRIPTION OF THE PREFERRED EMBODIMENTS

Figure 1:
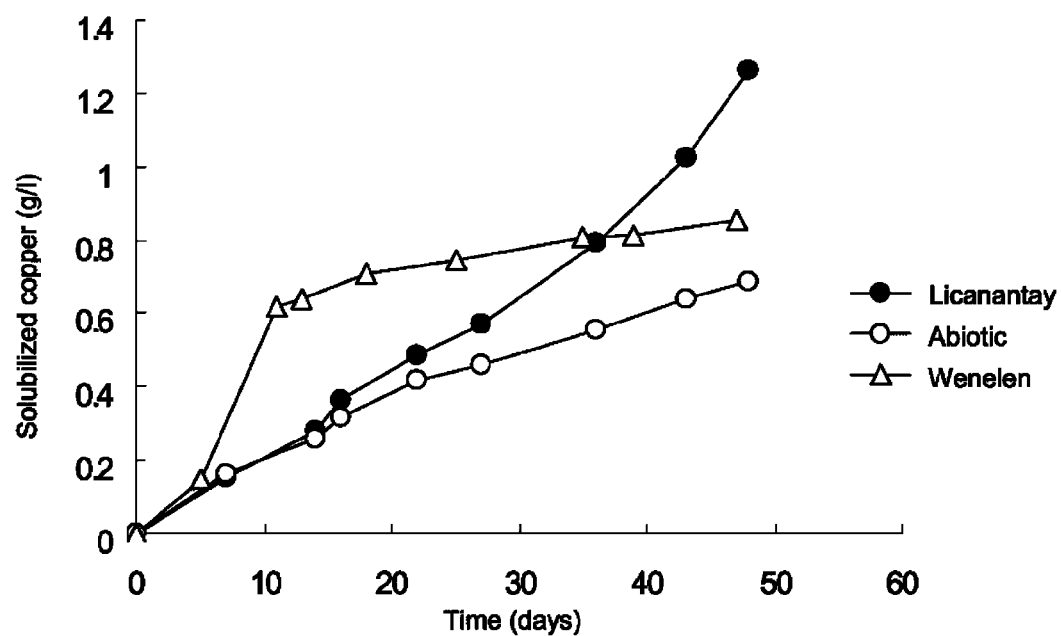
FIG. 1 shows copper liberation from chalcopyrite having a 28% copper content, using bacteria DSM 17318 and bacteria Wenelen DSM 16786 in leaching solution, as described in Example 1.

The present invention will be described in detail, as an example, with reference to the accompanying drawings. It should be noted that the present invention is not limited to the embodiments specifically disclosed.

The present invention is directed to a bioleaching process applied to many types of copper minerals and copper contents, being advantageously applied to chalcopyrite ($CuFeS_2$), which is known for being particularly resistant to leaching.

The bioleaching process in which the present invention can be implemented is not to be applied only to a sequential leaching process, but also is applicable to a stirred batch-reactor bioleaching process and to a bioleach deposit of particulate material, such as bioleaching in pools, tanks and reactors, piles, heaps, washing dams or other "in-situ" operations. Mineral can also be inoculated with recycle solutions from solvent extraction plants that contain Licanantay strain alone or in combination. The process is carried out aerobically at a pH preferentially between 1.0 and 1.8, and up to 2.5 in exceptional conditions. The amount of sulfur oxidizing mesophilic bacteria added to the bioleaching process is not restricted, but generally a concentration of bacteria between $10^6$ and $10^9$ cell/ml in the leaching solution is preferred.

It is to be understood that chalcopyrite dissolution and leaching progress by a sequence of reactions as described in the following reaction equations (1)-(3). If these reactions progress in an equilibrated way, copper bioleaching proceeds faster and progresses continually.

$$CuFeS_2 + 4Fe^{3+} \Rightarrow Cu^{2+} + 5Fe^{2+} + 2S \quad (1)$$

$$2Fe^{2+} + 0.5O_2 + 2H^+ \Rightarrow 2Fe^{3+} + H_2O \quad (2)$$

$$S + 1.5O_2 + H_2O \Rightarrow H_2SO_4 \quad (3)$$

In the present invention, sulfur-oxidizing mesophilic bacteria are added to the leaching solution to accelerate reaction (3), which has the lowest reaction constant among all the abovementioned reactions and therefore is a bottleneck. Elemental sulfur tends to precipitate over minerals, forming a passivating layer. It should be noted that reaction (3) is a sulfur-removing reaction, therefore sulfur coverage is not to be observed if reaction (3) proceeds at a higher rate. Moreover, as sulfur-oxidizing mesophilic bacteria are not involved in any iron oxidation-reduction reaction, acceleration of reaction (3) could be achieved, simultaneously preventing ORP to excessively increase by keeping ORP at 500 mV or lower.

ORP is defined as the ratio between ferric ion ($Fe^{3+}$) concentration and ferrous iron ($Fe^{2+}$) concentration. Iron oxidizing bacteria recycle ferrous ion to ferric ion in reaction (1), thus helping reaction (1) to be continued. In the case of sulfur-oxidizing bacteria not recycling said ion, this recycling occurs by environmental oxygen oxidation; therefore, it is preferable to perform the reaction of the present invention in an aerated environment.

Equation (1) reaction is said to be composed by two more reactions having the form of the following equations (4) and (5).

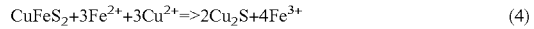

$$CuFeS_2 + 3Fe^{2+} + 3Cu^{2+} \Rightarrow 2Cu_2S + 4Fe^{3+} \quad (4)$$

$$Cu_2S + 4Fe^{3+} \Rightarrow 2Cu^{2+} + 4Fe^{2+} + S \quad (5)$$

According to results published by Okamoto et al. (Redox Potential Dependence and Optimum Potential of Chalcopyrite Leaching in Sulfuric acid Solutions. Shigen-to-Sozai, Vol 120 (2004) No. 10, 11 p 592-599), the rate of transformation from chalcopyrite to chalcocite (reaction 4) is higher at lower oxidation-reduction potentials; while reaction rate from chalcocite to copper ion is higher at higher ORPs. Therefore, it is convenient to maintain ORP at an intermediate level for both reactions to occur in an equilibrated way.

By performing bacterial bioleaching at pH values between 1.0 and 1.8, exceptionally up to pH 2.5, being this the condition at which sulfur-oxidizing mesophilic bacteria of the present invention are active, the generation of iron deposits, such as jarosite or the like that act as leaching inhibitors, is prevented. As the sulfur-oxidizing strain produces sulfuric acid, the leaching solution is acidified, which helps to dissolve soluble copper compounds (for example, copper oxide and copper sulfide) and is required for reaction (2). Therefore, it has been proved that efficient copper leaching is achieved by increasing $H^+$ concentration.

The sulfur-oxidizing mesophilic bacterial strain or species is *Acidithiobacillus thiooxidans*, and more preferably a single culture or a mixture containing strain Licanantay, which is deposited in Deutsche Sammlung von Mikroorganismen and Zellkulturen GmbH with number DSM 17318.

Strain Licanantay was isolated from samples obtained in mining operations, using an isolation strategy oriented to microorganism strains having sulfur-oxidizing activity. Samples were enriched in stirred flasks with 9KS liquid culture medium (3.0 g/L $(NH_4)_2SO_4$, 0.5 g/L $K_2HPO_4$, 0.5 g/L $MgSO_4 \times 7H_2O$, 0.1 g/L KCl and 0.1 g/L $Ca(NO_3)_2$, 1% elemental sulfur or other reduced sulfur compound), and then pure strains present in the samples were isolated. By assaying each strain separately, strain Licanantay was found to be the bacteria showing the highest copper recovery from chalcopyrite, when compared to the other isolated strains.

Strain Licanantay is an obliged acidophilic and aerobic Gram-negative bacterium that chemolithotrophically uses reduced sulfur compounds, such as elemental sulfur, thiosulfate or tetrathionate, shows good growth in 9KS liquid medium sustaining autotrophic growth at a maximum temperature of 30-35° C., but is not capable of oxidizing iron as other *Acidithiobacillus thiooxidans* species (Kelly D P, Wood A P, "Reclassification of some species of *Thiobacillus* to the newly designed genera *Acidithiobacillus* gen. Nov., *Halothiobacillus* gen. Nov and *Thermithiobacillus* gen. Nov.", Int. J. Syst. Evol. Microbiol. 2000, 50, 511-516). A partial 16S rDNA gene sequence of strain DSM 17318 is shown in FIG. 4.

The strain shows a high identity percentage at 16S rDNA sequence level with other *A. thiooxidans* strains deposited in international collections. Specifically, 100% identity was found with *Acidithiobacillus thiooxidans* ATCC19377 and *Acidithiobacillus thiooxidans* NBRC13701; likewise, 100% identity was found with *Acidithiobacillus albertensis* DSM 14366.

EXAMPLES

Example 1

Copper concentrate comprising mainly chalcopyrite with a 28% copper content, 28% iron content and 32% sulfur content, and the remaining being mainly silicon, zinc and calcium, was used.

3 g of the concentrate and 300 ml of leaching solution (3.0 g/L $(NH_4)_2SO_4$, 0.5 g/L $K_2HPO_4$, 0.5 g/L $MgSO_4 \times 7H_2O$, 0.1 g/L KCl and 0.1 g/L $Ca(NO_3)_2$) adjusted to a pH between 1.5 and 1.8 with sulfuric acid were mixed and poured into a 500 ml stirred flask. This mixture comprising concentrate and leaching solution was stirred at ambient temperature with addition of $10^7$ cells/ml of sulfur-oxidizing mesophilic bacteria Licanantay.

According to a comparative example, the sample was inoculated with $10^7$ cells of different mesophilic *Acidithiobacillus ferrooxidans* collection strains having iron-oxidizing activity (strain Wenelen DSM 16786).

FIG. 1 shows variations in copper concentration as a function of time with addition of mesophilic sulfur-oxidizing bacteria (Licanantay) and mesophilic iron-oxidizing bacteria (Wenelen). Copper contents in solution were measured using inductive coupled plasma atomic emission spectrometry (ICP-AES), extracting filtered samples in a micro-porous material (5 μm pore diameter). The figure shows that the use of a sulfur-oxidizing strain was favorable. Copper liberation is slower but more continuous, whereas an iron-oxidizing bacteria shows a fast liberation during the first ten process days, then quickly approaching a limit, said limit being 30% lower than the limit attained with the strain of the present invention.

Figure 2:
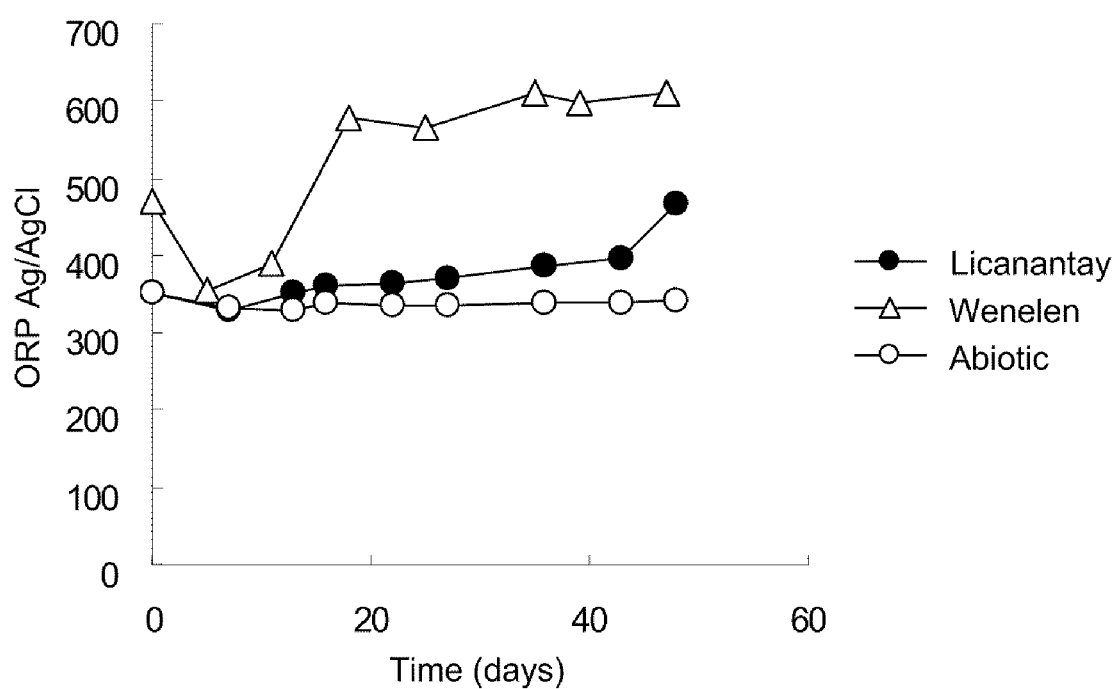
FIG. 2 shows ORP variations as a function of time, wherein copper leaching is carried out after the addition of diverse bacteria according to Example 1.

FIG. 2 shows ORP variation as a function of time according to Example 1 of the present invention. According to the abovementioned explanation, copper leaching was promoted through the leaching due to mesophilic sulfur-oxidizing bacteria. At the same time, ORP was kept at 500 mV referred to a Ag/AgCl reference electrode or less according to measures taken during leaching.

Example 2

Strain Licanantay was inoculated at a concentration of $10^7$ cells/ml in a final volume of 125 ml of the same leaching solution of Example 1 at pH 1.8, with the same chalcopyrite concentrate, in a 500 ml flask. As a comparative example, the mixture was inoculated with $10^7$ cells of strain *Acidithiobacillus thiooxidans* with sulfur oxidizing activity (DSM 508) or *Acidithiobacillus ferrooxidans* with iron-oxidizing activity (strain Wenelen DSM 16786) in the same conditions. The strains were cultured at 30° C. with stirring. Copper contents in solution were measured using atomic absorption spectrometry (AAS), extracting filtered samples in a micro-porous material (5 μm pore diameter).

Figure 3:
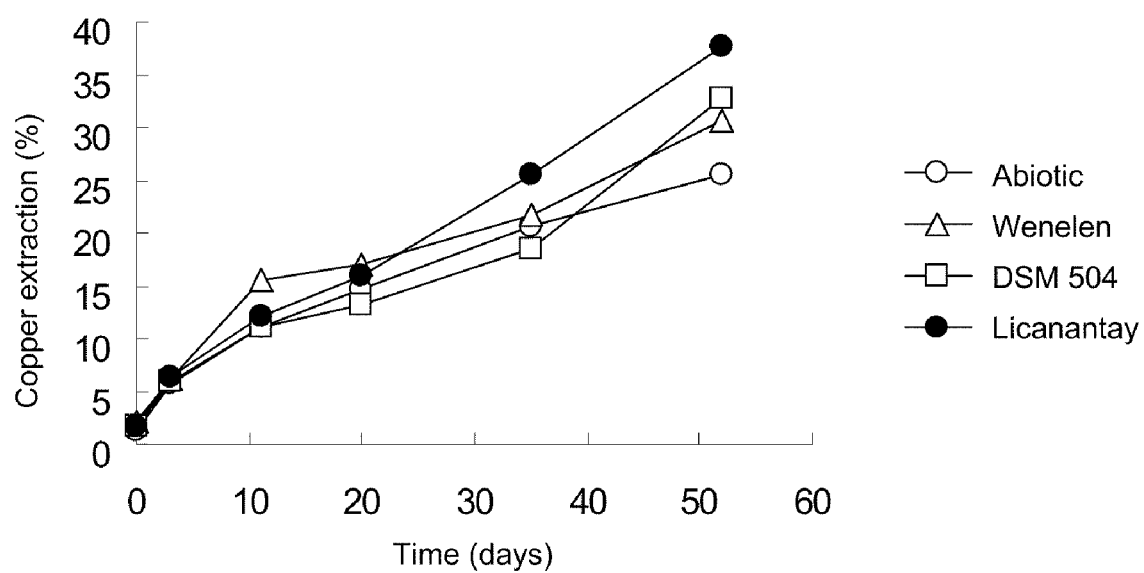
FIG. 3 shows copper liberation from chalcopyrite having a 28% copper content, using bacteria Licanantay and many state-of-the-art bacteria in leaching solution, described in Example 2.
Figure 5:
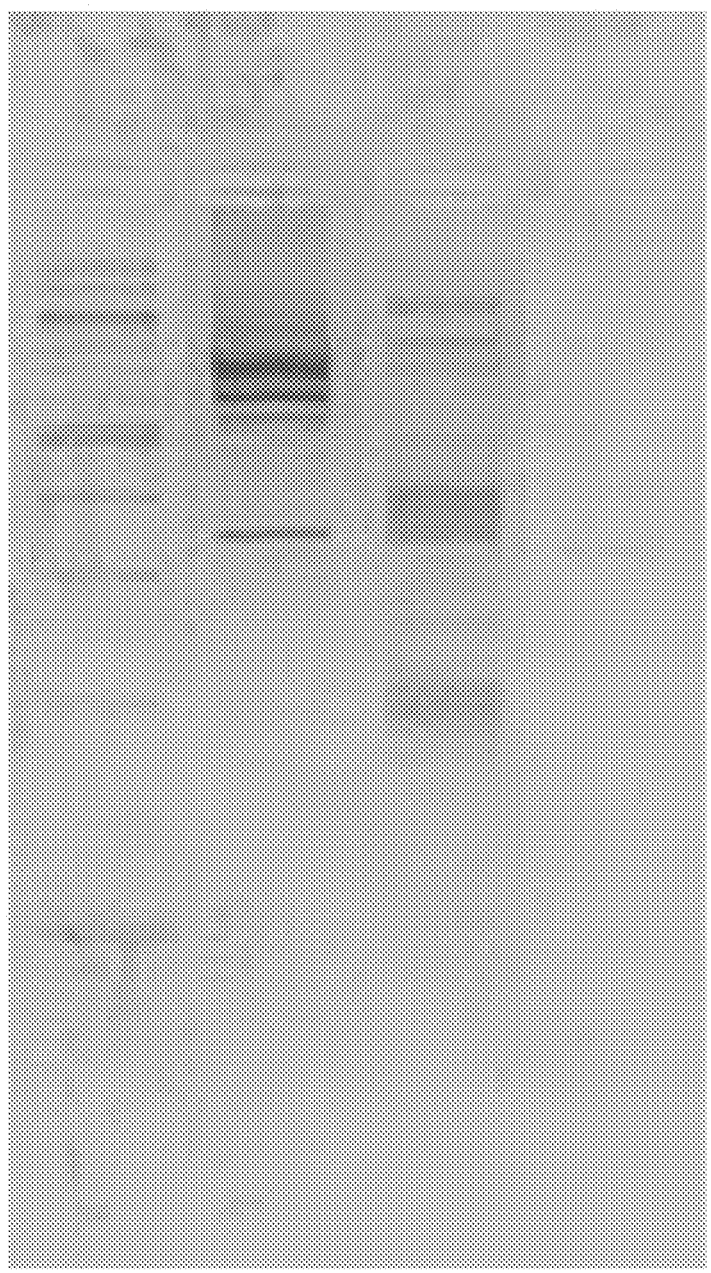
FIG. 5 shows a RAPD-PCR analysis of genomic differences between two *Acidithiobacillus thiooxidans* strains. St: 100 base pairs DNA ladder standard; 1: Collection strain DSM 504; 2: strain DSM 17318 isolated and deposited by Biosigma S. A.

FIG. 3 shows the copper extraction percentage from concentrate as a function of time with addition of mesophilic sulfur-oxidizing bacteria (Licanantay DSMZ 17318, *Acidithiobacillus thiooxidans* DSM 508) and mesophilic iron-oxidizing bacteria (Wenelen). The figure shows that a higher copper recovery is obtained in the case where the strain of the present invention, strain Licanantay, was used.

Similar experiments to Examples 1 and 2 were performed, but the mineral was inoculated with recycle solutions from solvent extraction plants that contained strain Licanantay DSM 17318; the results are basically the same as those obtained and shown in FIGS. 1, 2 and 3.

What is claimed is:

1. A mineral bioleaching process, comprising:
inoculating a sulfured metallic ore with an acid bacterial solution comprising an isolated bacterial strain belonging to species *Acidithiobacillus thiooxidans*, named Licanantay DSM 17318, deposited in DSMZ (Deutsche Sammlung von Mikroorganismen and Zellkulturen GmbH, Braunschweig, Germany), wherein said bacterial strain Licanantay DSM 17318 comprises sulfur-oxidizing activity and the acid bacterial solution comprises an effective amount of said bacterial strain Licanantay DSM 17318 to remove sulfur from the inoculated ore that acts as a leaching inhibitor in the bioleaching process; and
leaching copper minerals from the inoculated ore at ambient temperatures at a pH from 1.0 to 2.5.

2. The process of claim 1, comprising inoculating the sulfured metallic ore with an acid bacterial solution comprising an effective amount to remove sulfur from the inoculated ore of strain Licanantay DSM 17318 and one or more mesophilic sulfur-oxidizing bacterial strains.

3. The process of claim 1, wherein the sulfured metallic ore comprises chalcopyrite, bornite, chalcocite, covellite, tennantite, enargite, or a mixture thereof.

4. The process of claim 1, comprising leaching the copper minerals from the sulfured metallic ore in a pool, a tank, a reactor, a pile, a heap, or a washing dam.

5. A mineral bioleaching process, comprising:
inoculating a mixture of minerals with recycle solutions from solvent extraction plants, wherein the recycle solutions comprise an effective amount of *Acidithiobacillus ferroxidans* strain Licanantay DSM 17318 to remove sulfur from the mixture of minerals that acts as a leaching inhibitor in the bioleaching process, and
leaching copper minerals from the mixture of minerals at ambient temperatures at a pH from 1.0 to 2.5.

6. The process of claim 5, wherein the mineral comprises chalcopyrite, bornite, chalcocite, covellite, tennantite, enargite, or a mixture thereof.

7. The process of claim 5, comprising leaching the copper minerals from the mixture of minerals in a pool, a tank, a reactor, a pile, a heap, or a washing dam.

* * * * *

SEQUENCE LISTING

```
<160> NUMBER OF SEQ ID NOS: 1

<210> SEQ ID NO 1
<211> LENGTH: 1028
<212> TYPE: DNA
<213> ORGANISM: Acidithiobacillus thiooxidans DSM 17318

<400> SEQUENCE: 1
cgtgccagca gccgcggtaa tacgggggt gcaagcgtta atcggaatca ctgggcgtaa      60
agggtgcgta ggcggtgcat taggtctgtc gtgaaatccc cgggctcaac ctgggaatgg    120
cggtggaaac cggtgtacta gagtatggga gagggtggtg gaattccagg tgtagcggtg    180
```

-continued

```
aaatgcgtag agatctggag gaacatcagt ggcgaaggcg gccacctggc ccaatactga      240
cgctgaggca cgaaagcgtg gggagcaaac aggattagat accctggtag tccacgccct      300
aaacgatgaa tactagatgt ttggtgccaa gcgtactgag tgtcgtagct aacgcgataa      360
gtattccgcc tgggaagtac ggccgcaagg ttaaaactca aaggaattga cggggggcccg     420 cacaagcggt ggagcatgtg gtttaattcg atgcaacgcg aagaaccttaa cctgggcttg    480 acatgtctgg aatcctgcag agatgcggga gtgcccttcg gggaatcaga acacaggtgc     540
tgcatggctg tcgtcagctc gtgtcgtgag atgttgggtt aagtcccgca acgagcgcaa     600
cccttgtcct tagttgccag cggttcggcc gggcactcta gggagactgc cggtgacaaa     660
ccggaggaag gtggggatga cgtcaagtcc tcatggcctt tatgtccagg gctacacacg     720
tgctacaatg gcgcgtacag agggaagcca agccgcgagg tggagcagac cccagaaagc    780
gcgtcgtagt tcggattgca gtctgcaact cgactgcatg aagtcggaat cgctagtaat     840
cgcggatcag catgccgcgg tgaatacgtt cccgggcctt gtacacaccg cccgtcacac    900
catgggagtg gattgtacca gaagccgtta gcctaacctt cgggagggcg atgaccacgg    960
tatggttcat gactggggtg aagtcgtaac aaggtagccg taggggaacc tgcggctgga   1020
tcacctcc                                                            1028
```